United States Patent
Yanagisawa et al.

(10) Patent No.: US 8,278,586 B2
(45) Date of Patent: Oct. 2, 2012

(54) SINKER ELECTRIC DISCHARGE MACHINING METHOD, AND SINKER ELECTRIC DISCHARGE MACHINING APPARATUS

(75) Inventors: Tomoyuki Yanagisawa, Yokohama (JP); Tsuyoshi Hashimoto, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 464 days.

(21) Appl. No.: 12/672,669

(22) PCT Filed: Aug. 7, 2008

(86) PCT No.: PCT/JP2008/002161
§ 371 (c)(1),
(2), (4) Date: Mar. 11, 2010

(87) PCT Pub. No.: WO2009/019885
PCT Pub. Date: Feb. 12, 2009

(65) Prior Publication Data
US 2010/0213176 A1 Aug. 26, 2010

(30) Foreign Application Priority Data
Aug. 7, 2007 (JP) .................................. 2007-205197

(51) Int. Cl.
*B23H 7/14* (2006.01)
(52) U.S. Cl. .................................................... 219/69.13
(58) Field of Classification Search ............... 219/69.13
See application file for complete search history.

(56) References Cited

U.S. PATENT DOCUMENTS

| 3,558,844 | A | * | 1/1971 | Lobur | 219/69.1 |
| 3,590,317 | A | * | 6/1971 | Sennowitz | 315/202 |
| 3,614,368 | A | * | 10/1971 | Lobur | 219/69.18 |
| 3,627,968 | A | * | 12/1971 | Sennowitz | 219/69.13 |
| 3,670,136 | A | * | 6/1972 | Saito et al. | 219/69.13 |
| 3,697,719 | A | * | 10/1972 | Verner et al. | 219/69.19 |
| 3,875,362 | A | * | 4/1975 | Balleys | 219/69.17 |
| RE28,734 | E | * | 3/1976 | Inoue | 219/69.18 |
| 3,987,269 | A | * | 10/1976 | Inoue et al. | 219/69.17 |
| 4,491,713 | A | * | 1/1985 | Patton et al. | 219/69.11 |
| 5,352,859 | A | | 10/1994 | Kaneko et al. | |
| 5,359,169 | A | * | 10/1994 | Kaneko | 219/69.18 |
| 5,408,064 | A | * | 4/1995 | Takahara | 219/69.18 |
| 6,140,600 | A | * | 10/2000 | Kaneko et al. | 219/69.13 |
| 7,528,340 | B2 | * | 5/2009 | Yoneda et al. | 219/69.13 |

(Continued)

FOREIGN PATENT DOCUMENTS
JP 48-067895 9/1973
(Continued)

*Primary Examiner* — David E Graybill
(74) *Attorney, Agent, or Firm* — McDermott Will & Emery LLP (57) ABSTRACT

A sinker electric discharge machining apparatus for machining a workpiece by generating electric discharge in a work gap by applying a voltage having an OFF time, may include a discriminator for generating a first signal representing an abnormal state of the work gap, and a second signal representing a normal state of the work gap; and a pulse controller, in which a first extension factor and a second extension factor that is smaller than the first extension factor are set and a first reduction factor and a second reduction factor that is smaller than the first reduction factor are set. The pulse controller extends the OFF time using either the first or the second extension factor if the first signal is received. The pulse controller reduces the OFF time using either the first or the second reduction factor if the second signal is received.

4 Claims, 5 Drawing Sheets

U.S. PATENT DOCUMENTS

| | | | |
|---|---|---|---|
| 7,596,424 B2 * | 9/2009 | Lin | 700/162 |
| 7,598,470 B2 * | 10/2009 | Yamada et al. | 219/69.17 |
| 2008/0067154 A1 * | 3/2008 | Yamada et al. | 219/69.13 |

FOREIGN PATENT DOCUMENTS

| | | |
|---|---|---|
| JP | 57-036096 B1 | 8/1982 |
| JP | 2-065926 A | 3/1990 |
| JP | 2564389 B2 | 12/1996 |

* cited by examiner

SINKER ELECTRIC DISCHARGE MACHINING METHOD, AND SINKER ELECTRIC DISCHARGE MACHINING APPARATUS

FIELD

The subject technology relates to a sinker electric discharge machining method and apparatus. In particular, the subject technology relates to a sinker electric discharge machining method and apparatus for machining a workpiece by generating electric discharge in a work gap by applying a voltage having an OFF time.

BACKGROUND

A sinker electric discharge machining apparatus intermittently applies a voltage to a microscopic work gap that is filled with dielectric fluid. If the insulating properties of the dielectric fluid break down, electric discharge occurs in the work gap, and an ON time commences. During a controlled ON time, a current pulse is supplied to the work gap, and the workpiece material is removed. In order to restore the insulating properties of the dielectric fluid, application of voltage is stopped during a controlled OFF time.

If the insulating properties of the dielectric fluid are not sufficiently restored, undesirable sustained arc discharge occurs during the ON time. With sustained arc discharge, a current of high current density flows through the work gap. However, sustained arc discharge does not contribute to the removal of workpiece material. During sustained arc discharge, it is known that the voltage of the work gap (hereafter referred to as gap voltage) is low compared to transient arc discharge, which is normal electric discharge.

If the insulation characteristics during the OFF time deteriorate further, an abnormal state that has significant adverse effects on the machining of the workpiece arises in the work gap. An abnormal state is, for example, continuation of sustained arc discharge or concentrated electric discharge. Continuation of sustained arc discharge inflicts excessive wear of the tool electrode or irreversible damage on the workpiece. Concentrated electric discharge where electric discharge only occurs at the same location on the workpiece also inflicts damage on the workpiece. According to one approach, this type of abnormal state is avoided by significantly increasing the OFF time. However, an excessively increased OFF time adversely lowers machining efficiency.

Patent publication 1 discloses an electric discharge machining method that first rapidly extends an OFF time from an appropriate initial value to a suitably large specified value, when abnormal electric discharge has occurred. After being rapidly extended, the OFF time is then reduced in a stepwise manner in short units of time. The disclosed electric discharge machining method can avoid abnormal states and shorten machining time.

Patent publication 2 discloses an electric discharge machining method in which when an abnormal state is detected, an OFF time is extended from a reference value, and when a normal state is detected, the OFF time is reduced from the reference value. With this electric discharge machining method, steps for extending or reducing the OFF time are counted, and the reference value for the OFF time is changed in accordance with this step count. As a result, the OFF time control system is stable.

Patent Publication 1: Japanese patent No. 57-36096 Patent Publication 2: Japanese patent No. 2564389

SUMMARY

According to an aspect of the disclosure, a sinker electric discharge machining method of machining a workpiece by generating electric discharge in a work gap by applying a voltage having an OFF time, comprises extending the OFF time by selecting either a first extension factor or a second extension factor that is smaller than the first extension factor if an abnormal state of the work gap is detected.

According to another aspect of the disclosure, a sinker electric discharge machining method of machining a workpiece by generating electric discharge in a work gap by applying a voltage having an OFF time, comprises extending the OFF time by selecting either a first extension duration or a second extension duration that is smaller than the first extension duration if an abnormal state of the work gap is detected.

According to another aspect of the disclosure, a sinker electric discharge machining method of machining a workpiece by generating electric discharge in a work gap by applying a voltage having an OFF time, comprises reducing the OFF time by selecting either a first reduction factor or a second reduction factor that is smaller than the first reduction factor if a normal state of the work gap is detected.

According to another aspect of the disclosure, a sinker electric discharge machining method of machining a workpiece by generating electric discharge in a work gap by applying a voltage having an OFF time, comprises reducing the OFF time by selecting either a first reduction duration or a second reduction duration that is smaller than the first reduction duration if a normal state of the work gap is detected.

According to another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for having a first extension factor and a second extension factor that is smaller than the first extension factor set and for extending the OFF time using either the first extension factor or the second extension factor if the first signal is received.

According to another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for having a first extension duration and a second extension duration that is smaller than the first extension duration set and for extending the OFF time using either the first extension duration or the second extension duration if the first signal is received.

According to another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for having a first reduction factor and a second reduction factor that is smaller than the first reduction factor set and for reducing the OFF time using either the first reduction factor or the second reduction factor if the second signal is received.

According to another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for having a first reduction duration and a second reduction duration that is smaller than the first reduction duration set and for reducing the OFF time using either the first reduction duration or the second reduction duration if the second signal is received.

According to another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for extending the OFF time in response to the first signal and reducing the OFF time in response to the second signal. The pulse controller is configured to extend the OFF time using a first extension factor if the first signal is received following reduction of the OFF time, and extend the OFF time using a second extension factor that is smaller than the first extension factor if the first signal is received following extension of the OFF time.

According to yet another aspect of the disclosure, a sinker electric discharge machining apparatus for machining a workpiece by generating electric discharge in a work gap by applying a voltage having an OFF time, comprises: a discriminator for generating a first signal representing an abnormal state of the work gap, and a second signal representing a normal state of the work gap; and a pulse controller for extending the OFF time in response to the first signal and reducing the OFF time in response to the second signal. The pulse controller is configured to reduce the OFF time using a first reduction factor if the second signal is received following extension of the OFF time, and reduce the OFF time using a second reduction factor that is smaller than the first reduction factor if the first signal is received following reduction of the OFF time.

REFERENCE NUMERALS 1 work gap, 2 dc power supply, 3 switching element, 4 current-limiting resistor, 5 reverse current prevention diode, 6 detection resistor, 10 detector, 20 discriminator, 30 pulse controller, 40 pulse generator, 50 timing pulse generator, 60 reference voltage setting device, 80 determination reference setting unit, 90 initial value setting device, 100 reference value setting device

DETAILED DESCRIPTION

Figure 1:
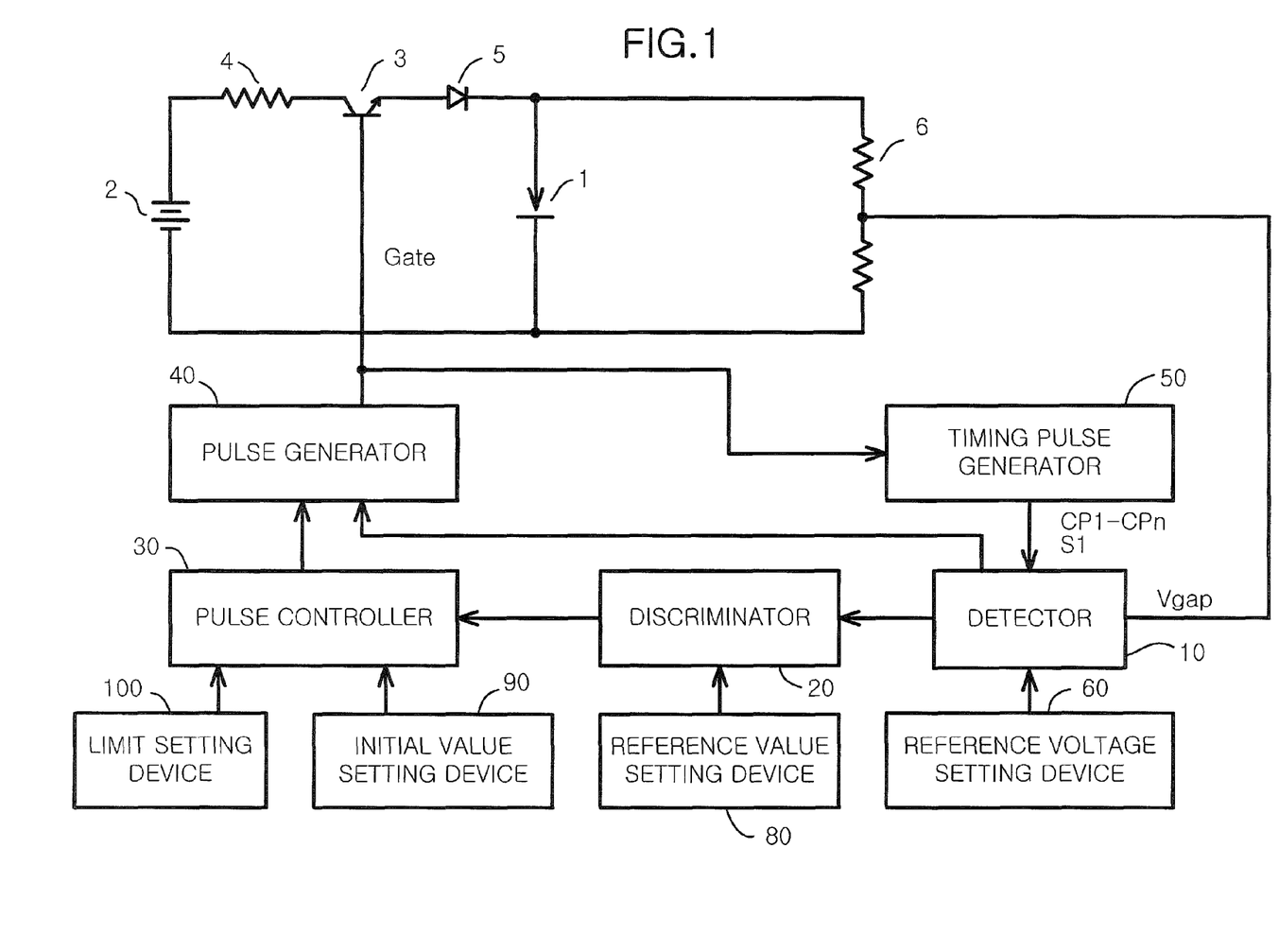
FIG. 1 is a block diagram showing an example of a sinker electric discharge machining apparatus of the present invention.
Figure 2:
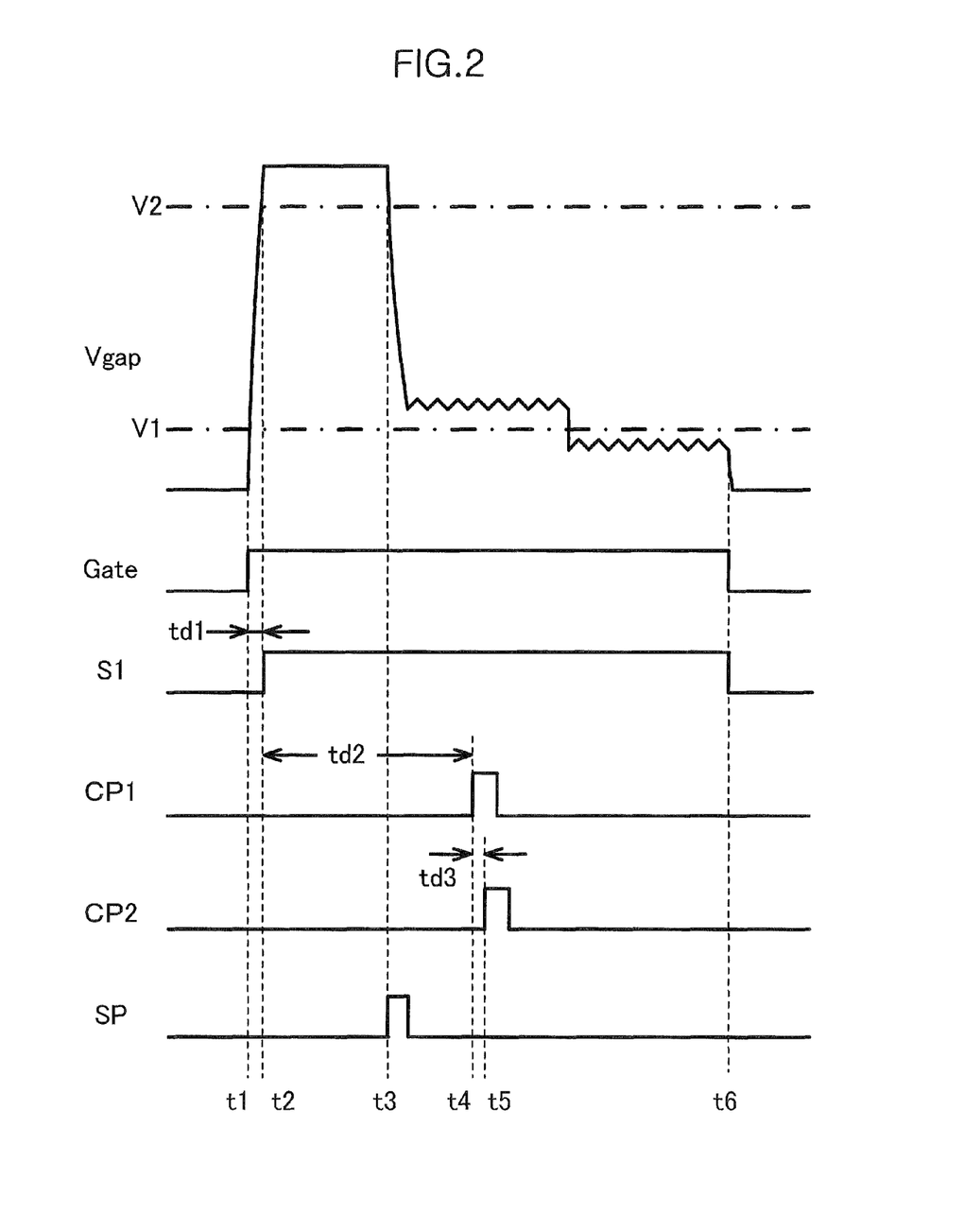
FIG. 2 is a timing chart showing an example of an operation of the sinker electric discharge machining apparatus of FIG. 1.

An example of a sinker electric discharge machining apparatus of the present invention is described with reference to FIG. 1 and FIG. 2. A dc power supply 2 is connected in series with a work gap 1 formed between a tool electrode and a workpiece. A plurality of serial connections made up of a current limiting resistor 4, switching element 3 and reverse current prevention diode 4 are connected in parallel between the dc power supply 2 and the work gap. In order to simplify the drawings, only one serial connection is shown in FIG. 1. It is also possible to insert inductance elements in this serial connection, as required. The plurality of switching elements 3 are controlled by a gate signal Gate transmitted from the pulse generator 40. A detection resistor 6 is connected to the dc power supply 2, in parallel with the work gap 1. The detection resistor 6 detects a gap voltage Vgap of the work gap 1. An example of the gap voltage Vgap is shown in FIG. 2.

A reference voltage setting device 60 sets a first reference voltage V1 and a second reference voltage V2. The first reference voltage V1 is set according to the material of the tool electrode and the workpiece. The second reference voltage V2 is set according to electrical machining conditions, and in particular peak current value and no-load voltage (that is, an output voltage of the dc power supply 2). The second reference voltage V2 is usually several volts lower than the no-load voltage and higher than the first reference voltage V1.

A timing pulse generator 50 is connected to a pulse generator 40, and generates many check pulses CP1-CPn. As shown in FIG. 2, at time t1 the pulse generator 40 turns on the gate signal Gate. At time t2 when a first time td1 has elapsed from time t1, the timing pulse generator 50 generates a signal S1. The first time td1 is a sufficient time for the gap voltage Vgap to rise to the second reference voltage V2 from time t1 under normal electric discharge. At time t4 when a second time td2 has elapsed from time t2, the timing pulse generator 50 generates a check pulse CP1. The second time td2 is slightly longer than a no-load time that would be expected at the time of suitable electric discharge, and is shorter than the ON time. At time t5 when a third time td3 has elapsed from time t4, the timing pulse generator 50 generates a check pulse CP2. In this manner, the timing pulse generator 50 generates the many check pulses CP1-CPn. At time t6 when the gate signal Gate is turned off, the timing pulse generator 50 turns off the signal S1.

A detector 10 is adapted to receive the gap voltage Vgap, and is connected to a reference voltage setting device 60 and the timing pulse generator 50. The detector 10 compares the gap voltage Vgap to a first reference voltage V1 every time a check pulse CP1-CPn is received. When the gap voltage Vgap is higher than the first reference voltage V1, a "0" level signal is generated. When the gap voltage Vgap is lower than or equal to the first reference voltage V1, a "1" level signal is generated. The detector 10 supplies an NG signal representing unsuitable electric discharge to a discriminator 20 when at least one "1" level signal is generated during one electric discharge. Unsuitable electric discharge is mainly sustained arc discharge. The detector 10 supplies an OK signal representing suitable electric discharge to the discriminator 20 as long as there is absolutely no "1" level signal generated during one electric discharge. Suitable electric discharge is a healthy spark discharge maintaining a transient arc voltage. In this way, the detector 10 classifies each electric discharge as a suitable electric discharge or a unsuitable electric discharge.

Alternatively, the detector 10 may supply the NG signal to the discriminator 20 when two consecutive "1" level signals are generated during one electric discharge, and when that is not the case supply the OK signal to the discriminator 20. In addition, the detector 10 compares the gap voltage Vgap to the second reference voltage V2 to detect the start of electric discharge. If the signal S1 is ON and the gap voltage Vgap is less than or equal to the second reference voltage V2, an impulse signal SP representing the start of electric discharge is generated.

A reference value setting device 80 sets a first reference value to be compared to a count value for the NG signal, and a second reference value to be compared to a count value for the OK signal. The first and second reference values are preferably set according to the type of tool electrode. The reference value setting device 80 also sets a first reset reference value for comparison with a number of consecutive NG pulses, and a second reset reference value for comparison with a number of consecutive OK signals.

The discriminator 20 is connected to the detector 10 and the reference value setting device 80, and has a first counter for counting NG signals and a second counter for counting OK signals. When a count value for the NG signal reaches the first reference value, the discriminator 20 supplies an NGc signal representing an abnormal state of the work gap 1 to a pulse controller 30. The abnormal state is a condition where there is a possibility of concentrated electric discharge or continuation of sustained arc discharge. When the count value for the OK signal reaches the second reference value, the discriminator 20 supplies an OKc signal representing a normal state of the work gap 1 to the pulse controller 30. The normal state is a condition where there is no possibility of concentrated electric discharge or continuation of sustained arc discharge.

The discriminator 20 temporarily stores a flag representing the latest NG signal or OK signal. If the discriminator 20 receives an NG signal following an NG signal, the number of consecutive NG signals is incremented. If the discriminator 20 receives an OK signal following an OK signal, the number of consecutive OK signals is incremented. When the number of consecutive NG signals reaches the first reset reference value, the discriminator 20 resets the count value of the second counter. As a result, it is possible to prevent reduction in the OFF time even when sustained arc discharge is continuing. When the number of consecutive OK signals reaches the second reset reference value, the discriminator 20 resets the count value of the first counter. As a result, it is possible to prevent extension in the OFF time even when suitable electric discharge is continuing.

A limit setting device 100 sets an upper limit and a lower limit for the OFF time. The OFF time lower limit is a minimum duration required for dielectric recovery of the work gap. When a ferrous workpiece is machined using a graphite tool electrode, the lower limit is set to about 0.1 times the ON time. The upper limit is set to 256-512 times the lower limit so that the OFF time is not excessively extended. An initial value setting device 90 sets initial values for machining conditions, such as OFF time and peak current. Machining is prone to being unstable immediately after the commencement of machining, and so the initial value is set higher than the lower limit. The initial value is preferably set to 8-16 times the lower limit.

The pulse controller 30 is connected to the discriminator 20, the initial value setting device 90 and the limit setting device 100, and supplies command data representing ON time, OFF time and peak current to the pulse generator 40. In one aspect, the pulse controller 30 always changes the OFF time as required according to the NGc signal and the OKc signal. At least two different extension factors and at least two different reduction factors are set in the pulse controller 30. In order to improve machining efficiency, the pulse controller 30 extends the OFF time by selectively using the two extension factors, and reduces the OFF time by selectively using the two reduction factors.

The pulse controller 30 temporarily stores a flag representing whether the latest change to the OFF time is an extension or a reduction. In other words, the flag represents whether the latest input signal is an NGc signal or an OKc signal. The pulse controller 30 rapidly extends the OFF time with the first extension factor if an NGc signal is received following an OFF time reduction. If an NGc signal is received following an OFF time extension, the OFF time is further extended with the second extension factor that is smaller than the first extension factor. If the pulse controller 30 receives an OKc signal following an OFF time extension, the OFF time is rapidly reduced using the first reduction factor. If an OKc signal is received following an OFF time reduction, the OFF time is further reduced with the second reduction factor that is smaller than the first reduction factor.

The pulse controller 30 rapidly extends the OFF time by a first extension duration if an NGc signal is received following an OKc signal. If an NGc signal is received following an NGc signal, the OFF time is further extended at a second extension duration that is smaller than the first extension duration. If the pulse controller 30 receives an OKc signal following an NGc signal, the OFF time is rapidly reduced using a first reduction duration. If the OKc signal is received following an OKc signal, the OFF time is further reduced by a second reduction duration that is smaller than the first reduction duration.

The first and second extension factors are 2 to the nth power ($2^n$). The first extension factor is, for example, "16". The second extension factor is made as small a value as possible, for example "2". The first and second reduction factors are 2 to the nth power ($2^n$). The first reduction factor is, for example, "16". The second reduction factor is made as small a value as possible, for example "2". The second extension duration is a half or less than a half of the first extension duration. In addition, the second reduction duration is a half or less than a half of the first reduction duration.

The pulse generator 40 is connected to the detector 10 and the pulse controller 30, and generates a gate signal Gate according to command data. If the gate signal Gate is turned on, the switching elements 3 is turned on, and the voltage of the dc power supply 2 is applied to the work gap 1. As shown in FIG. 2, as a result of the application of voltage, electric discharge occurs at time t3. The pulse generator 40 turns off the gate signal Gate at time t6 when the ON time has elapsed from time t3.

Figure 3:
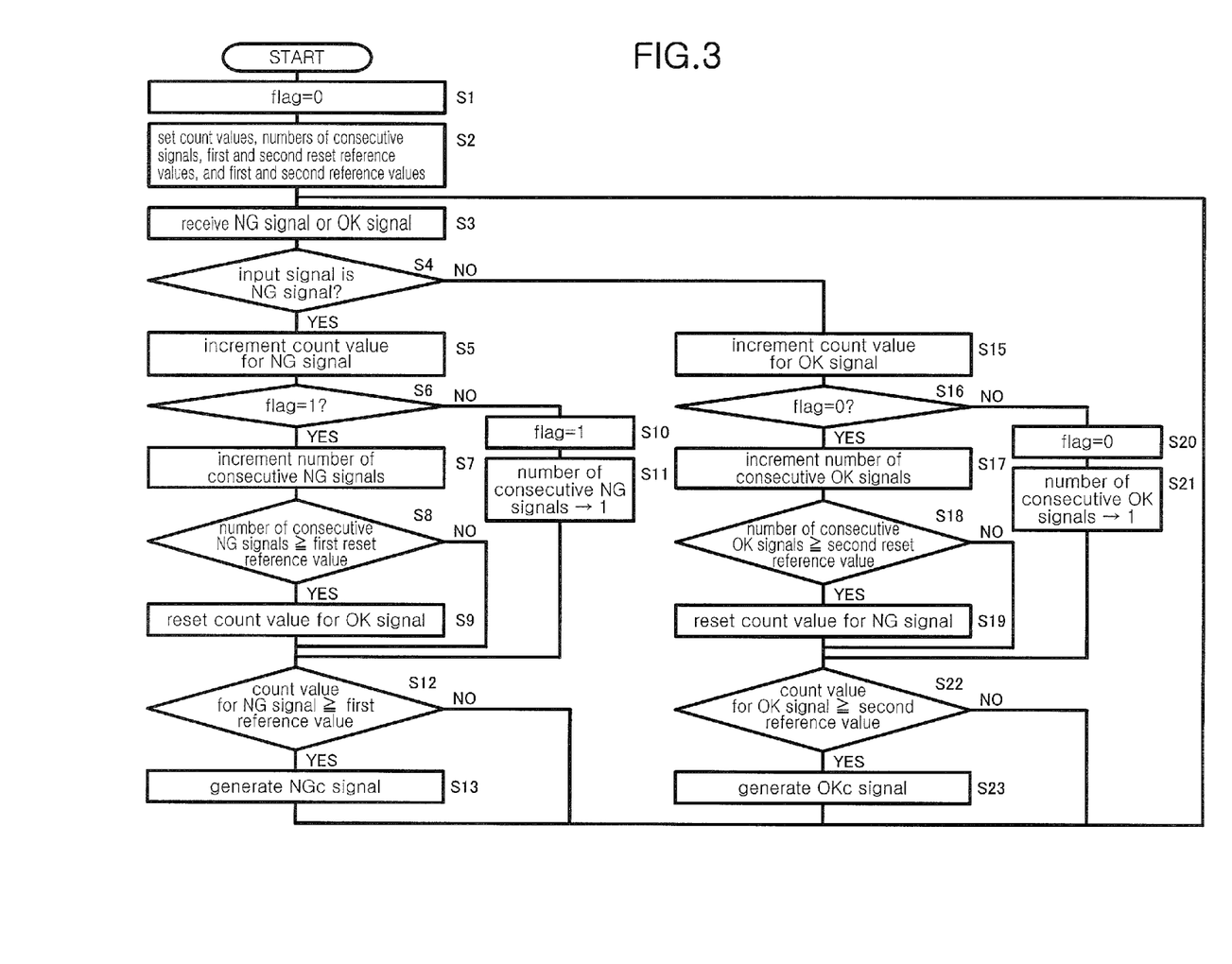
FIG. 3 is a flowchart showing an example of an operation of a discriminator in FIG. 1.

An example of an operational process for the discriminator 20 is described with reference to FIG. 3. At step S1, the discriminator 20 sets a flag to "0". In step S2, the discriminator 20 sets the count value for the NG signal, count value for the OK signal, number of consecutive NG signals, number of consecutive OK signals, first and second reset reference values, and first and second reference values. The count value for the NG signal and the count value for the OK signal are set to "0". The number of consecutive NG signals and number of consecutive OK signals are also set to "0". The first reset reference value is set to "2", for example. The second reset reference value is set to "5", for example. In order to change the OFF time immediately in response to a change in the state of the work gap 1, the first and second reference values are set to "1".

In step S3, the discriminator 20 receives an NG signal or an OK signal. In step S4, if the input signal is an NG signal, then in step S5 the count value for the NG signal is incremented. When the flag is "1" in step S6, in other words when the NG signal is consecutive, the number of consecutive NG signals is incremented in step S7. If the number of consecutive NG signals has reached the first reset reference value in step S8, the count value for OK signal is reset to "0" in step S9. Otherwise, the process skips to step S12. Following step S9, the process advances to step S12.

If the flag is "0" in step S6, then in step S10 the discriminator 20 sets the flag to "1" representing that the latest input signal is an NG signal. In the next step S11, the number of consecutive NG signals is set to "1".

In step S12, the discriminator 20 compares the count value for the NG signal to the first reference value. If the count value for NG signal is greater than or equal to the first reference value, the discriminator 20 supplies the NGc signal to the pulse controller 30 in step S13. Otherwise, the process loops back to step S3. Following step S13, the process loops back to step S3.

In step S4, if the input signal is an OK signal, the count value for the OK signal is incremented in step S15. If the flag is "0" in step S16, in other words if the OK signal is consecutive, then in step S17, the number of consecutive OK signals is incremented. If the number of consecutive OK signals has reached the second reset reference value in step S18, the count value for NG signals is reset to "0" in step S19. Otherwise, the process skips to step S22. Following step S19, the process advances to step S22.

If the flag is "1" in step S16, the discriminator 20 sets the flag to "0" representing that the latest input signal is an OK signal, in step S20. In the next step S21, the number of consecutive OK signals is set to "1".

In step S22, the discriminator 20 compares the count value for OK signal to the second reference value. If the count value for OK signal is greater than or equal to the second reference value, the discriminator 20 supplies the OKc signal to the pulse controller 30 in step S23. Otherwise, the process loops back to step S3. Following step S23, the process loops back to step S3.

Figure 4:
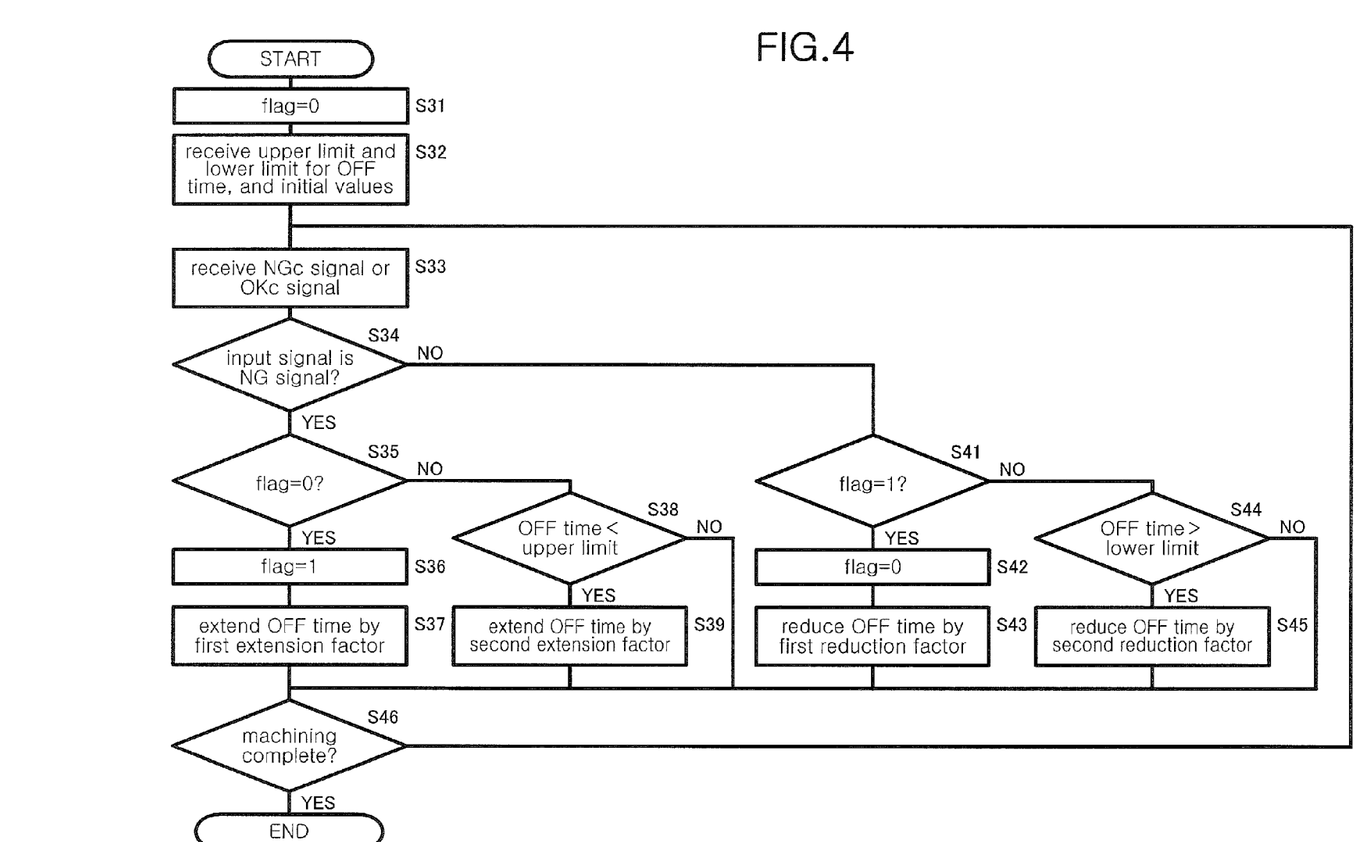
FIG. 4 is a flowchart showing an example of an operation of a pulse controller in FIG. 1.
Figure 5:
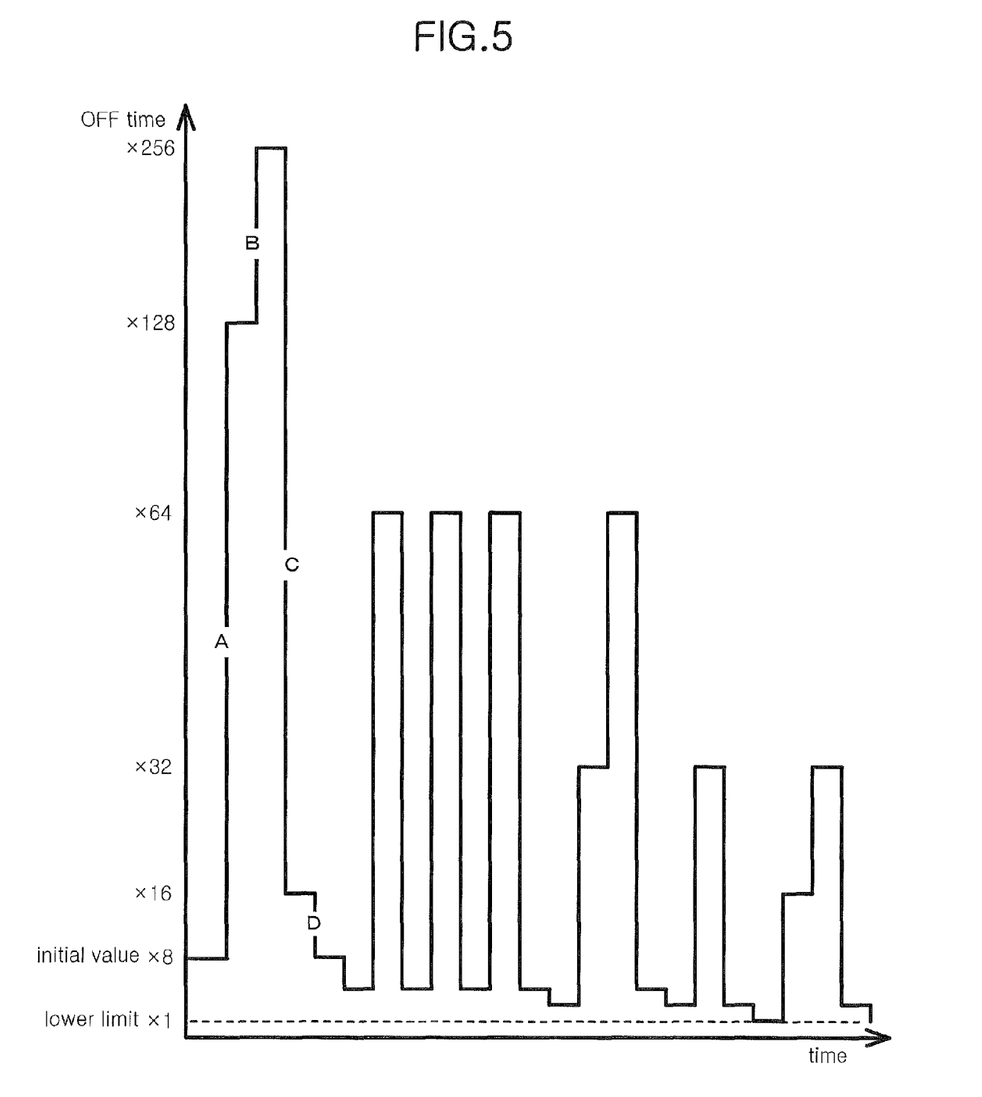
FIG. 5 is a graph showing an example of an operation of the pulse controller of FIG. 1.

An example of an operational process for the pulse controller 30 is described with reference to FIG. 4 and FIG. 5. The pulse controller 30 extends or reduces the OFF time according to the NGc signal and the OKc signal. The OFF time is extended using at least two different extension factors. In addition, the OFF time is reduced using at least two different reduction factors. The OFF time may be extended using two different extension durations, instead of the extension factors. The OFF time may be reduced using two different reduction durations instead of the reduction factors. One example of the extension or reduction of the OFF time is shown in FIG. 5.

In step S31, the pulse controller 30 sets a flag to "0". In addition, in step S32, the pulse controller 30 receives the upper limit and lower limit for OFF time. The upper limit is "512" and the lower limit is "1". The pulse controller 30 also receives the initial value for OFF time, and provides command data for OFF time to the pulse generator 40. In FIG. 5, the initial value for OFF time is set to 8 times the lower limit.

In step S33, the pulse controller 30 receives an NGc signal or an OKc signal. In step S34, if the input signal is an NGc signal, the process advances to step S35. If the flag is "0" in step S35, then in step S36, the flag is set to "1" representing that the latest input signal is an NGc signal. In the next step S37, the OFF time is extended using the first extension factor. The line A in FIG. 5 shows that the OFF time has been extended rapidly to 16 times the initial value. After step S37, if machining is complete in step S46, the process terminates. Otherwise, the process loops back to step S33.

If the flag is "1" in step S35, in other words if the NGc signal is consecutive, the OFF time is compared to the upper limit in step S38. If the OFF time is smaller than the upper limit in step S38, then in step S39, the OFF time is extended using the second extension factor. The line B in FIG. 5 shows that the OFF time has been extended by twice the current value. Following step S39, the process advances to step S46. If the OFF time is greater than or equal to the upper limit in step S38, the process skips to step S46.

If the input signal is an OKc signal in step S34, the process advances to step S41. If the flag is "1" in step S41, the flag is set to "0" representing that the latest input signal is an OKc signal, in step S42. In the next step S43, the OFF time is rapidly reduced using the first reduction factor. The line C in FIG. 5 shows that the OFF time has been rapidly reduced to 16 times the current value, in other words, to ¹⁄₁₆th of the value. Following step S43, the process advances to step S46.

If the flag is "0" in step S41, in other words if the OKc signal is consecutive, the OFF time is compared to the lower limit in step S44. If the OFF time is larger than the lower limit in step S44, the OFF time is reduced using the second reduction factor in step S45. The line D in FIG. 5 shows that the OFF time has been reduced by twice the current value, in other words, it has become ½. Following step S45, the process advances to step S46. If the OFF time is less than or equal to the lower limit in step S44, the process skips to step S46.

According to one aspect, the subject technology relates to a sinker electric discharge machining apparatus for machining a workpiece by generating electric discharge by supplying voltage to a work gap formed between a tool electrode and a workpiece. According to another aspect, the subject technology particularly relates to a sinker electric discharge machining apparatus that controls an OFF time, when supply of voltage is stopped, according to the state of the work gap.

According to one aspect, an objective of the subject technology is to provide a sinker electric discharge machining method and sinker electric discharge machining apparatus with further improved machining efficiency. In order to achieve this objective, in one aspect, OFF time that should be extended when an abnormal state arises is minimized. In addition, OFF time when a normal state arises is brought close to a lower limit as rapidly as possible.

According to one aspect of the subject technology, a sinker electric discharge machining method of machining a workpiece by generating electric discharge in a work gap by applying a voltage having an OFF time, comprises extending the OFF time by selecting either a first extension factor or a second extension factor that is smaller than the first extension factor if an abnormal state of the work gap is detected.

In this way, by selecting at least two different extension factors, excessive extension of the OFF time when an abnormal state arises is avoided. At least two different extension durations may be selected instead of two different extension factors.

According to another aspect of the subject technology, a sinker electric discharge machining method of machining a workpiece by generating electric discharge in a work gap by applying a voltage having an OFF time, comprises reducing the OFF time by selecting either a first reduction factor or a second reduction factor that is smaller than the first reduction factor if a normal state of the work gap is detected.

In this way, by selecting at least two different reduction factors, it is possible to bring the OFF time close to a lower limit as rapidly as possible when a normal state arises. At least two different reduction durations may be selected instead of two different reduction factors.

According to another aspect of the subject technology, a sinker electric discharge machining apparatus for machining a workpiece by generating electric discharge in a work gap by applying a voltage having an OFF time, comprises: a discriminator (20) for generating a first signal (NGc) representing an abnormal state of the work gap, and a second signal (OKc) representing a normal state of the work gap; and a pulse controller (30), in which a first extension factor and a second extension factor that is smaller than the first extension factor are set, for extending the OFF time using either the first or the second extension factor if the first signal is received.

The pulse controller may extend the OFF time by the first extension factor if the first signal following the second signal is received, and extend the OFF time by the second extension factor if a succession of the first signals are received.

According to another aspect of the subject technology, a sinker electric discharge machining apparatus for machining a workpiece by generating electric discharge in a work gap by applying a voltage having an OFF time, comprises: a discriminator (20) for generating a first signal (NGc) representing an abnormal state of the work gap, and a second signal (OKc) representing a normal state of the work gap; and a pulse controller (30), in which a first reduction factor and a second reduction factor that is smaller than the first reduction factor are set, for reducing the OFF time using either the first or the second reduction factor if the second signal is received.

The pulse controller may reduce the OFF time by the first reduction factor if the second signal following the first signal is received, and reduce the OFF time by the second reduction factor if a succession of the second signals are received.

According to another aspect of the subject technology, a sinker electric discharge machining apparatus for machining a workpiece by generating electric discharge in a work gap by applying a voltage having an OFF time, comprises: a discriminator (20) for generating a first signal (NGc) representing an abnormal state of the work gap and a second signal (OKc) representing a normal state of the work gap; and a pulse controller (30) for extending the OFF time in response to the first signal and reducing the OFF time in response to the second signal. The pulse controller extends the OFF time using a first extension factor if the first signal is received following reduction of the OFF time, and extends the OFF time using a second extension factor that is smaller than the first extension factor if the first signal is received following extension of the OFF time.

According to yet another aspect of the subject technology, a sinker electric discharge machining apparatus for machining a workpiece by generating electric discharge in a work gap by applying a voltage having an OFF time, comprises: a discriminator (20) for generating a first signal (NGc) representing an abnormal state of the work gap and a second signal (OKc) representing a normal state of the work gap, and a pulse controller (30) for extending the OFF time in response to the first signal and reducing the OFF time in response to the second signal. The pulse controller reduces the OFF time using a first reduction factor if the second signal is received following extension of the OFF time, and reduces the OFF time using a second reduction factor that is smaller than the first reduction factor if the first signal is received following reduction of the OFF time.

According to one aspect of the subject technology, OFF time that should be extended when an abnormal state arises can be minimized. In addition, OFF time when a normal state arises can be brought close to a lower limit as rapidly as possible. As a result, efficiency of electric discharge machining is improved.

The present invention is not limited to the above described embodiments, and various modifications are possible.

The invention claimed is:

1. A sinker electric discharge machining apparatus for machining a workpiece by generating electric discharge in a work gap by applying a voltage having an OFF time, comprising: a discriminator for generating a first signal representing an abnormal state of the work gap, and a second signal representing a normal state of the work gap; and a pulse controller for having a first extension factor and a second extension factor that is smaller than the first extension factor and for extending the OFF time by the first extension factor if the first signal following the second signal is received, and for extending the OFF time by the second extension factor if a succession of first signals are received.

2. A sinker electric discharge machining apparatus for machining a workpiece by generating electric discharge in a work gap by applying a voltage having an OFF time, comprising: a discriminator for generating a first signal representing an abnormal state of the work gap, and a second signal representing a normal state of the work gap; and a pulse controller for having a first reduction factor and a second reduction factor that is smaller than the first reduction factor and for reducing the OFF time by the first reduction factor if the second signal following the first signal is received, and for reducing the OFF time by the second reduction factor if a succession of second signals are received.

3. A sinker electric discharge machining apparatus for machining a workpiece by generating electric discharge in a work gap by applying a voltage having an OFF time, comprising: a discriminator for generating a first signal representing an abnormal state of the work gap, and a second signal representing a normal state of the work gap; and a pulse controller for extending the OFF time in response to the first signal and reducing the OFF time in response to the second signal, wherein the pulse controller is configured to extend the OFF time using a first extension factor if the first signal is received following reduction of the OFF time, and extend the OFF time using a second extension factor that is smaller than the first extension factor if the first signal is received following extension of the OFF time.

4. A sinker electric discharge machining apparatus for machining a workpiece by generating electric discharge in a work gap by applying a voltage having an OFF time, comprising: a discriminator for generating a first signal representing an abnormal state of the work gap, and a second signal representing a normal state of the work gap; and a pulse controller for extending the OFF time in response to the first signal and reducing the OFF time in response to the second signal, wherein the pulse controller is configured to reduce the OFF time using a first reduction factor if the second signal is received following extension of the OFF time, and reduce the OFF time using a second reduction factor that is smaller than the first reduction factor if the first signal is received following reduction of the OFF time.

* * * * *